United States Patent
Jones et al.

(10) Patent No.: US 7,290,217 B2
(45) Date of Patent: *Oct. 30, 2007

(54) MANAGING POSITION AND SIZE FOR A DESKTOP COMPONENT

(75) Inventors: Christopher R Jones, Seattle, WA (US); Christopher R Brown, Seattle, WA (US); Michael A Schmidt, Issaquah, WA (US); Sankar Ramasubramanian, Redmond, WA (US); Sean L Flynn, North Bend, WA (US); Edward J Anderson, Duvall, WA (US); Mark H Enomoto, Seattle, WA (US); Gayna Williams, Seattle, WA (US); Bryan T Starbuck, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 526 days.

This patent is subject to a terminal disclaimer.

(21) Appl. No.: 10/949,838

(22) Filed: Sep. 24, 2004

(65) Prior Publication Data
US 2005/0039147 A1   Feb. 17, 2005

Related U.S. Application Data

(63) Continuation of application No. 09/024,311, filed on Feb. 17, 1998, now Pat. No. 6,819,345.

(51) Int. Cl.
*G06F 17/00* (2006.01)

(52) U.S. Cl. ............ 715/764; 715/856; 715/517; 715/788; 345/145; 345/146

(58) Field of Classification Search ............ 715/764, 715/781, 853–855, 856–862, 517–521, 788, 715/790, 791, 796, 799, 808, 812, 817; 345/157, 345/163, 145, 146
See application file for complete search history.

(56) References Cited

U.S. PATENT DOCUMENTS

| | | | |
|---|---|---|---|
| 4,819,189 A * | 4/1989 | Kikuchi et al. ............ 715/797 |
| 4,931,783 A | 6/1990 | Atkinson |
| 5,068,804 A * | 11/1991 | Watanabe et al. ............ 358/452 |

(Continued)

OTHER PUBLICATIONS

IBM, "System Application Architecture—Common User Access Advanced Interface Design Guide,"pp. 29-30, Jun. 1989.

*Primary Examiner*—Tadesse Hailu
(74) *Attorney, Agent, or Firm*—Christensen O'Connor Johnson Kindness PLLC

(57) ABSTRACT

In a graphical desktop environment displaying desktop components, a control is provided to track the position of a pointer on a screen, and when the pointer enters relevant regions with respect to a desktop component, a thin or thick border in displayed around the desktop component to enable a user to resize the desktop component, and/or a caption bar is displayed along an edge of the component to enable a user to move the desktop component on the desktop. The caption bar may additionally be provided with menu and close buttons, to enable the user to bring up a menu of properties and/or actions for the desktop component, and close the desktop component, respectively. When the pointer is outside any region relevant to a desktop component, no borders or caption bars are displayed, thereby resulting in a visually less cluttered appearance.

15 Claims, 8 Drawing Sheets

U.S. PATENT DOCUMENTS

| | | |
|---|---|---|
| 5,581,686 A | 12/1996 | Koppolu et al. |
| 5,586,244 A * | 12/1996 | Berry et al. ................. 715/788 |
| 5,745,100 A | 4/1998 | Bates et al. |
| 5,760,771 A | 6/1998 | Blonder et al. |
| 5,808,601 A * | 9/1998 | Leah et al. ................. 715/856 |
| 5,914,718 A * | 6/1999 | Chiu et al. .................. 715/863 |
| 6,065,035 A * | 5/2000 | Shulman et al. ............ 718/100 |
| 6,078,308 A * | 6/2000 | Rosenberg et al. ......... 715/856 |
| 6,091,415 A * | 7/2000 | Chang et al. ................ 715/809 |
| 6,128,633 A * | 10/2000 | Michelman et al. ........ 715/525 |
| 6,311,196 B1 * | 10/2001 | Arora et al. ................. 715/513 |
| 6,359,695 B1 * | 3/2002 | Takahashi et al. ........... 358/1.1 |
| 6,597,383 B1 * | 7/2003 | Saito .......................... 715/860 |

\* cited by examiner

MANAGING POSITION AND SIZE FOR A DESKTOP COMPONENT

CROSS-REFERENCE TO RELATED APPLICATION

This application is a continuation of application Ser. No. 09/024,311, filed Feb. 17, 1998, now U.S. Pat. No. 6,819,345 priority from the filing date of which is hereby claimed under 35 U.S.C. § 120.

FIELD OF THE INVENTION

The present invention is directed to the field of graphical user interfaces, and more specifically to the manipulation of visual components in such interfaces.

BACKGROUND OF THE INVENTION

Many of today's computers are accessible through graphical user interfaces (GUIs). One popular implementation is Windows 95, by Microsoft Corporation, of Redmond, Wash., which is a windows-based operating system, in which multiple applications may independently execute under the operating system, each within its own separate window.

In a windows-based operating system, interaction with the computer is presented to the user through a desktop theme, under which commonly used applications and/or documents are displayed and accessed using graphical icons on the desktop.

In recent years, there has been a tremendous proliferation of computers connected to a global network known as the Internet. A "client" computer connected to the Internet can download digital information from "server" computers connected to the Internet. Client application software executing on client computers typically accept commands from a user and obtain data and services by sending requests to server applications running on server computers connected to the Internet. A number of protocols are used to exchange commands and data between computers connected to the Internet. The protocols include the File Transfer Protocol (FTP), the Hypertext Transfer Protocol (HTTP), the Simple Mail Transfer Protocol (SMTP), and the "Gopher" document protocol.

The HTTP protocol is used to access data on the World Wide Web, often referred to as "the Web." The World Wide Web is an information service on the Internet providing documents and links between documents. The World Wide Web is made up of numerous Web sites around the world that maintain and distribute electronic documents. A Web site may use one or more Web server computers that store and distribute documents in one of a number of formats including the Hypertext Markup Language (HTML). An HTML document contains text and metadata or commands providing formatting information. HTML documents also include embedded "links" that reference other data or documents located on any Web server computers. The referenced documents may represent text, graphics, or video in respective formats.

A Web browser is a client application or operating system utility that communicates with server computers via FTP, HTTP, and Gopher protocols. Web browsers receive electronic documents from the network and present them to a user. Internet Explorer, available from Microsoft Corporation, of Redmond, Wash., is an example of a popular Web browser application.

In addition to data and metadata, HTML documents can contain embedded software components containing program code that perform a wide variety of operations. These software components expand the interactive ability of an HTML document's user interface. The components can perform other operations, such as manipulating data and playing audio or video clips. ActiveX is a specification developed by Microsoft Corporation for creating software components that can be embedded into an HTML document. Java is a well-known programming language that can be used to develop components called "applets," which are transmitted with HTML documents from Web servers to client computers. JavaScript and VBScript are scripting languages that are also used to extend the capabilities of HTML. JavaScript and VBScript scripts are embedded in HTML documents. A browser executes each script as it reaches the position in the script during interpretation of the HTML document.

With today's windows-based operating systems, which are multi-tasking, a user may use a web browser to open multiple windows, each with different content. Since each HTML document may contain scripts of various types, which may in turn open additional windows, a user's desktop display can quickly become visually cluttered due to each window having such elements as borders, control tabs, menu bars, title bars, scroll bars, minimize, maximize, and restore buttons, resizing corners, and other elements which provide functionality to windows.

SUMMARY OF THE INVENTION

The present invention provides a control which tracks the position of a pointer on the display screen to monitor its location relative to one or more desktop components. These desktop components, some of which normally benefit from having associated borders, caption bars, and/or other window functionality elements displayed therewith, are displayed as images lacking these elements until relevant pointer events are detected by the control, whereupon the associated element is displayed, thereby reducing visual clutter. For instance, when the control detects that the pointer has completely entered a region defined by a desktop component, a thin, one-pixel border is displayed around the desktop component. When the pointer intersects with an edge of the desktop component, a thicker, three-pixel border is displayed. When the pointer is close to the top edge of the desktop element, a caption bar is displayed atop the desktop component. When the pointer moves away from the desktop component, the control disappears, rendering borders and caption bars invisible.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
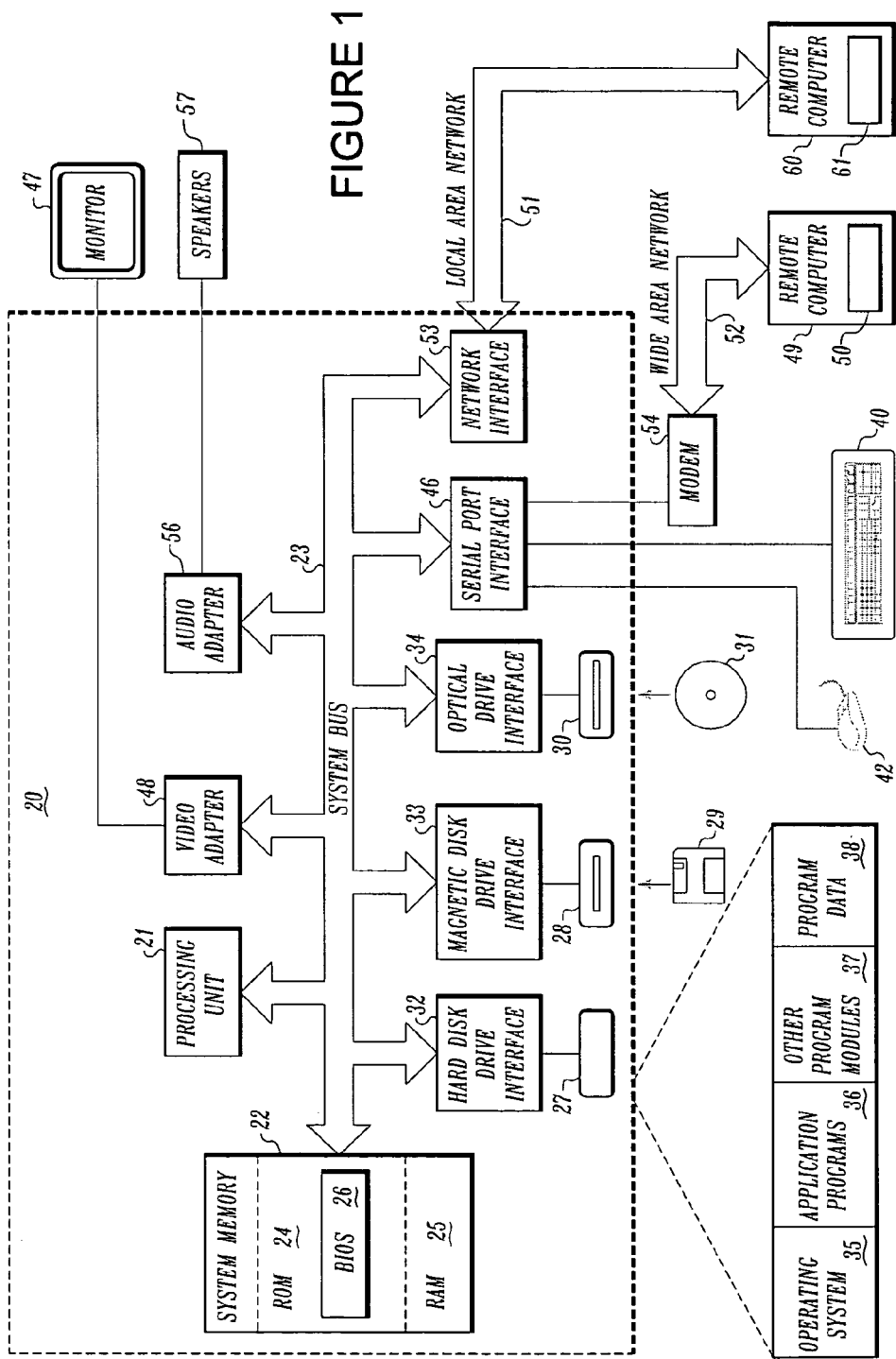
FIG. 1 is a block diagram of a general purpose computer system for implementing the present invention.

In accordance with the present invention, the system of the present invention executes on a computer, such as a general purpose personal computer. FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. System timing is provided by a clock signal (not shown) applied to the system bus 23. The system memory includes read only memory (ROM) 24 and random access memory (RAM) 25. A basic input/output system 26 (BIOS), containing the basic routines that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer-readable media which can store data that is accessible by a computer, such as magnetic cassettes, flash memory cards, digital versatile disks (also known as Digital Video Disks or DVDs), Bernoulli cartridges, random access memories (RAMs), read only memories (ROMs), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. One or more speakers 57 are also connected to the system bus 23 via an interface, such as an audio adapter 56. In addition to the monitor and speakers, personal computers typically include other peripheral output devices (not shown), such as printers.

The personal computer 20 may operate in a networked environment using logical connections to one or more remote computers, such as remote computers 49 and 60. Each remote computer 49 or 60 may be another personal computer, a server, a router, a network PC, a peer device or other common network node, and typically includes many or all of the elements described above relative to the personal computer 20, although only a memory storage device 50 or 61 has been illustrated in FIG. 1. The logical connections depicted in FIG. 1 include a local area network (LAN) 51 and a wide area network (WAN) 52, Such networking environments are commonplace in offices, enterprise-wide computer networks, intranets and global networks such as the Internet. As depicted in FIG. 1, the remote computer 60 communicates with the personal computer 20 via the local area network 51. The remote computer 49 communicates with the personal computer 20 via the wide area network 52.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
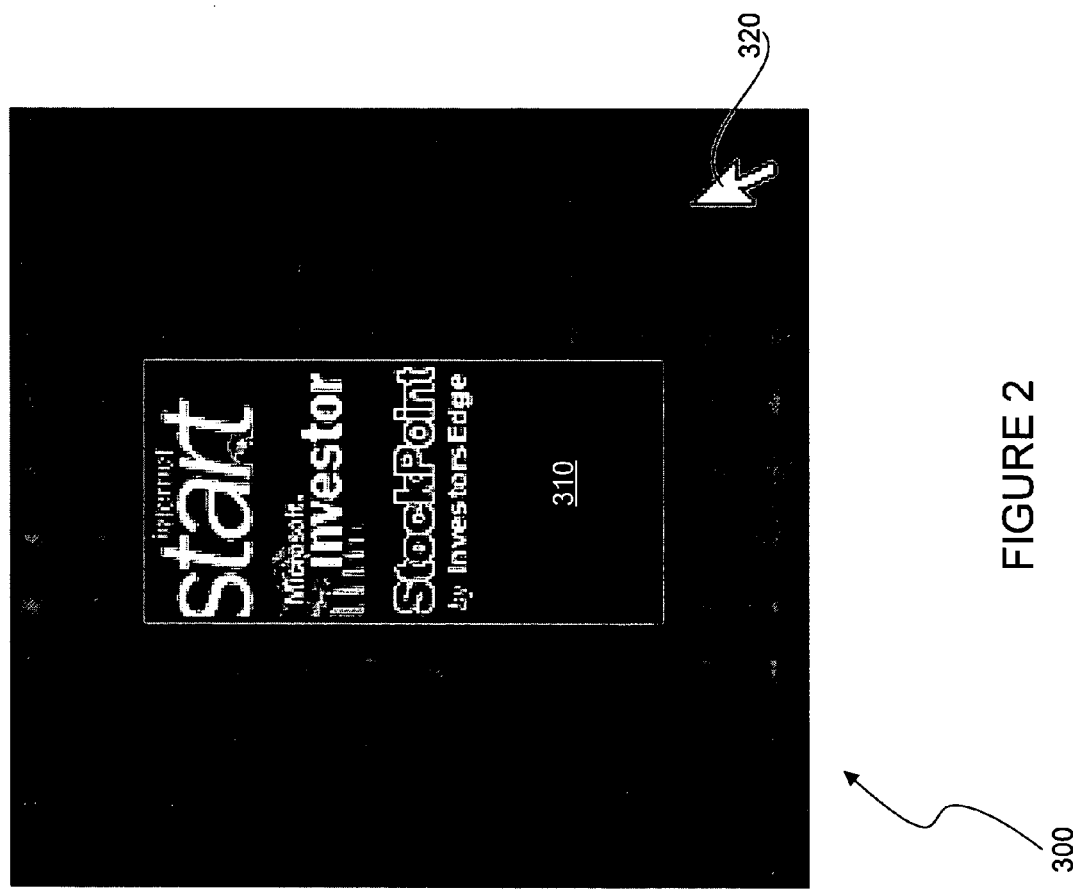
FIG. 2 depicts a desktop component having no border.

In the present invention a composite document including one or more subdocuments visually embedded therein is output to a display. In a present embodiment of the invention, a desktop 300 environment is displayed with one or more desktop components 310. Referring to FIG. 2, desktop component 310 is shown in a first state in which the desktop component merely appears as an image on the desktop 300, rather than as a window with accompanying windows functionality elements such as borders, caption bars, etc. This is the default state for all desktop components where the pointer 320 is not within a predefined region with respect to the desktop component. The concept of regions will be described more fully in the discussion of FIG. 6.

Figure 3:
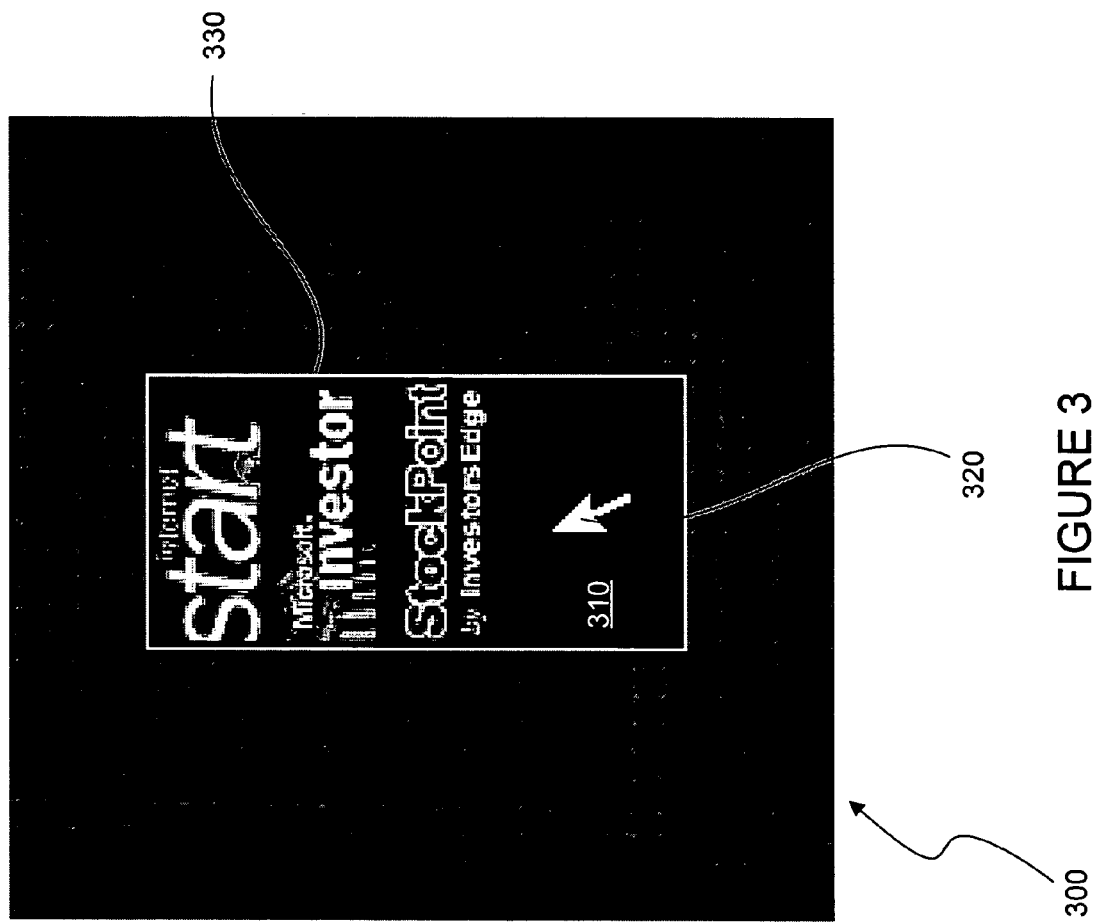
FIG. 3 depicts a desktop component having a thin border.

FIG. 3 depicts a desktop component 310 in a second state in which pointer 320 is displayed completely within an area defined by the desktop component. In this situation, a thin border 330 is displayed around the desktop component 310. In a present embodiment, the thin border 330 has a one-pixel width, and is used to visually indicate the boundaries of the desktop component. This allows a user to more easily position the pointer on the desktop component boundary for resizing the desktop component, and is especially helpful where there is little contrast between the colors of the desktop 300 and the desktop component.

Figure 4:
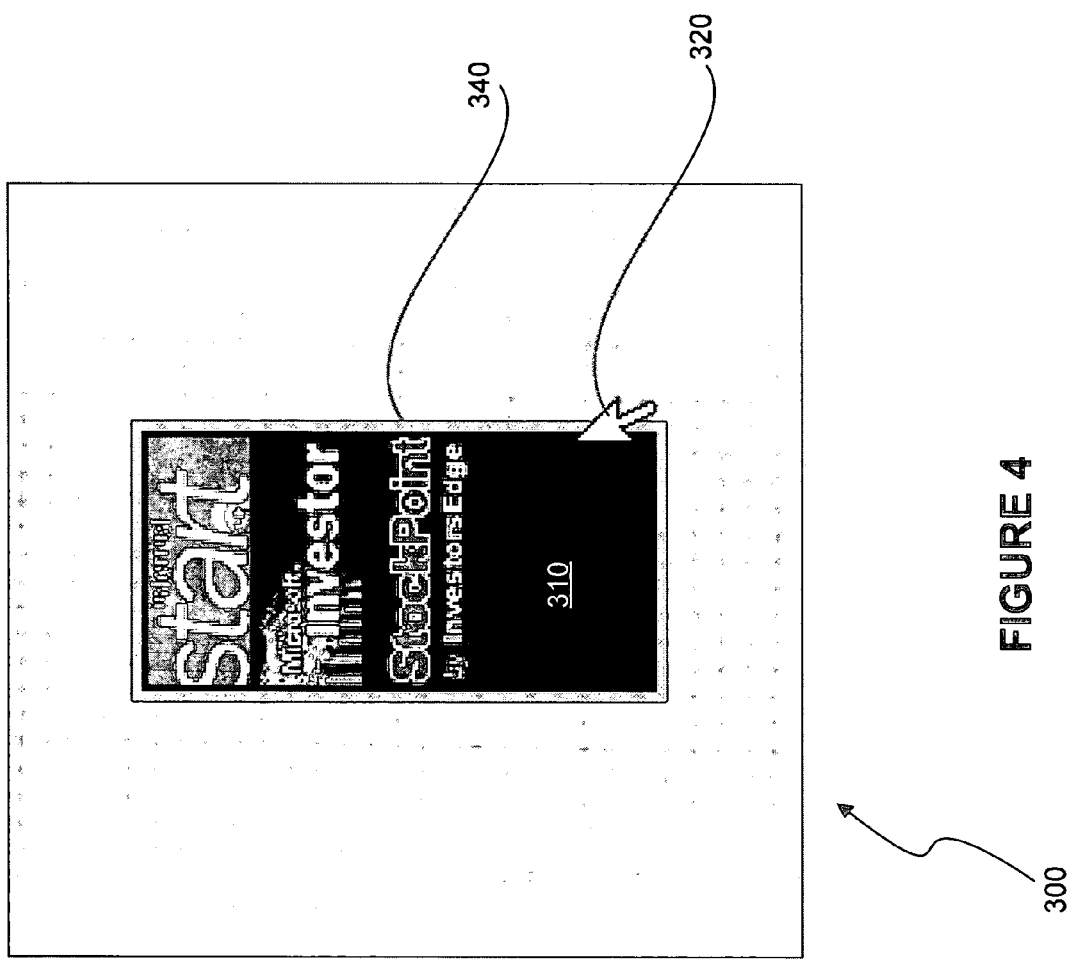
FIG. 4 depicts a desktop component having a thick border.

FIG. 4 depicts the desktop component 310 in a third state in which pointer 320 is in close proximity to, or actually intersecting, an edge of the desktop component. In this situation, a thick border 340 is displayed. In a present embodiment, a three-pixel border is used so that the user may more easily interact with the border, such as for resizing the desktop element.

Figure 5:
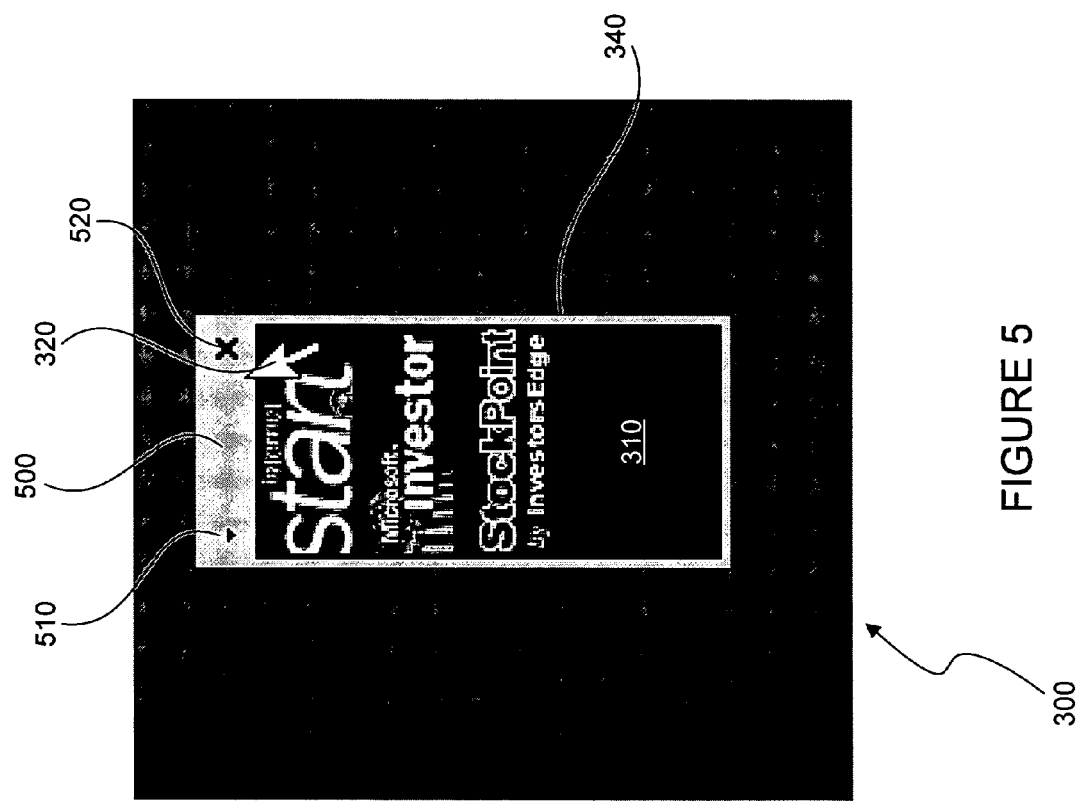
FIG. 5 depicts a desktop component having a title bar.

FIG. 5 depicts the desktop component 310 in a fourth state, in which a caption bar 500 is displayed along an edge of the desktop component. In a present embodiment of the invention, the caption bar is displayed along the top edge of the desktop component for allowing a user to interact with the desktop component, such as for moving the desktop component on the desktop. In a present embodiment of the invention, the caption bar is displayed with a thick border 340 around the other edges, and is provided with a minimize button 510 and a close button 520, for allowing the user to respectively minimize and close the desktop component. The caption bar is displayed along the top border when pointer 320 is in close proximity to the upper edge of the desktop component. Those skilled in the art will readily appreciate that the caption bar 500 may be displayed along any edge of the desktop component, that any edge may be used as the relevant edge for determining whether the caption bar should be displayed, and that any type of border, including no border may be displayed in conjunction with the caption bar. The caption bar may also include other features, such as a title, not specifically shown in the figures.

Figure 6:
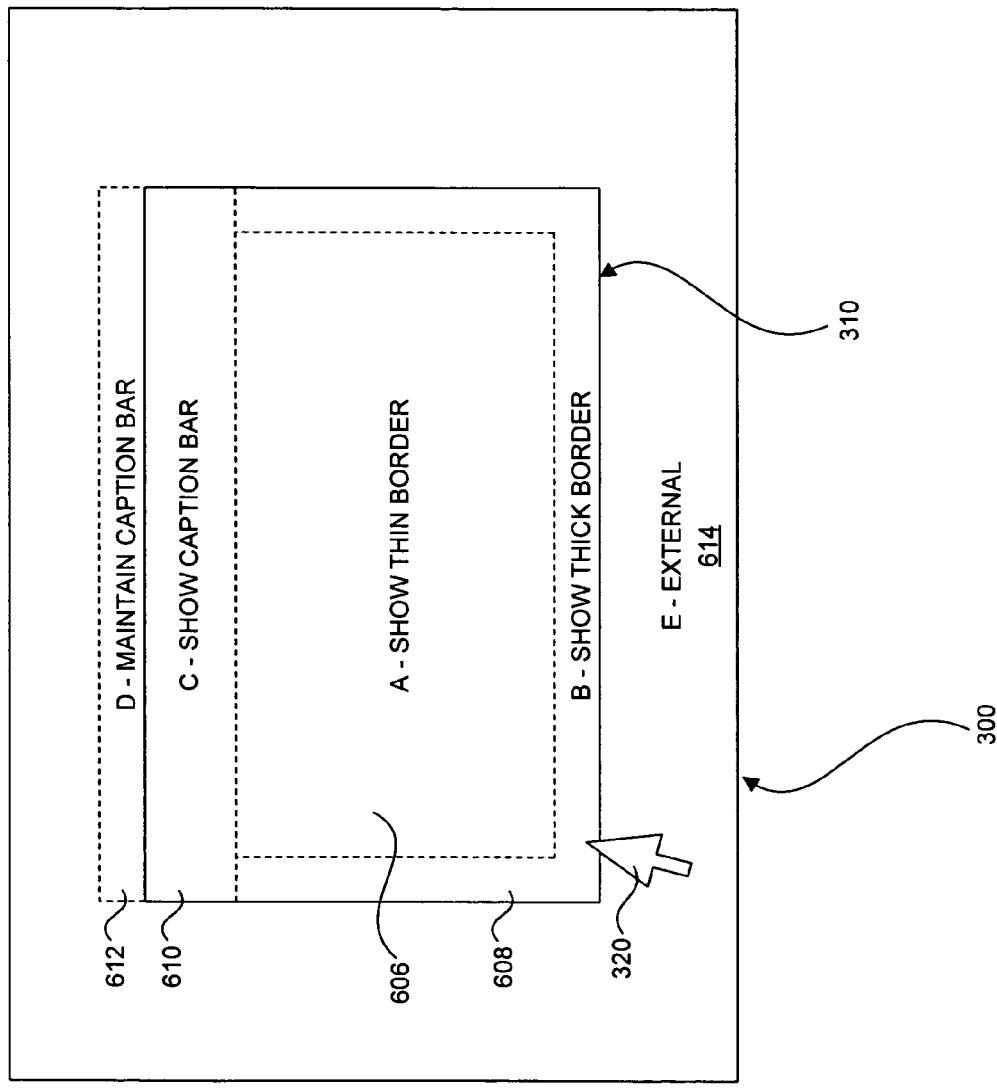
FIG. 6 illustrates regions around a desktop component representing relevant pointer events according to an aspect of the present invention.

FIG. 6 depicts several regions relative to a desktop component 310 and illustrates the creation and deletion of borders and the caption bar based on the position and movement of the pointer 320. The solid lines in FIG. 6 represent the boundary or perimeter of the desktop component 310. The dashed lines delineate regions proximate to the desktop component perimeter. For example, when a user positions the pointer 320 within region A 606, the mechanism of the invention displays a thin border 330 (FIG. 3) surrounding the desktop component 310. When the pointer 320 is positioned within region B 608, the mechanism of the invention displays a thick border 340 (FIG. 4) surrounding the desktop component 310. When the pointer 320 is positioned within region C 610, the mechanism of the invention displays a caption bar 500 (FIG. 5) above the desktop component 310 and a thick border 340 surrounding the remaining three sides of the desktop component.

Region D 612 represents an area for the caption bar 500, and only exists when the caption bar 500 is visible. When the caption bar is visible as a result of the pointer being moved into region C 610, positioning of the pointer within region D 612 causes the mechanism of the invention to maintain the visibility of the caption bar. At times when the caption bar is not visible, the area represented by region D 612 is considered to be part of the external region E 614, which is the entire area outside of all of the other regions discussed above. When the pointer 320 is moved into region E 614, the caption bar 500, the thin border 330, and the thick border 340, are not visible. As discussed below, preferably a timer is used to delay changing the state when the pointer moves into the external region E 614.

Figure 7:
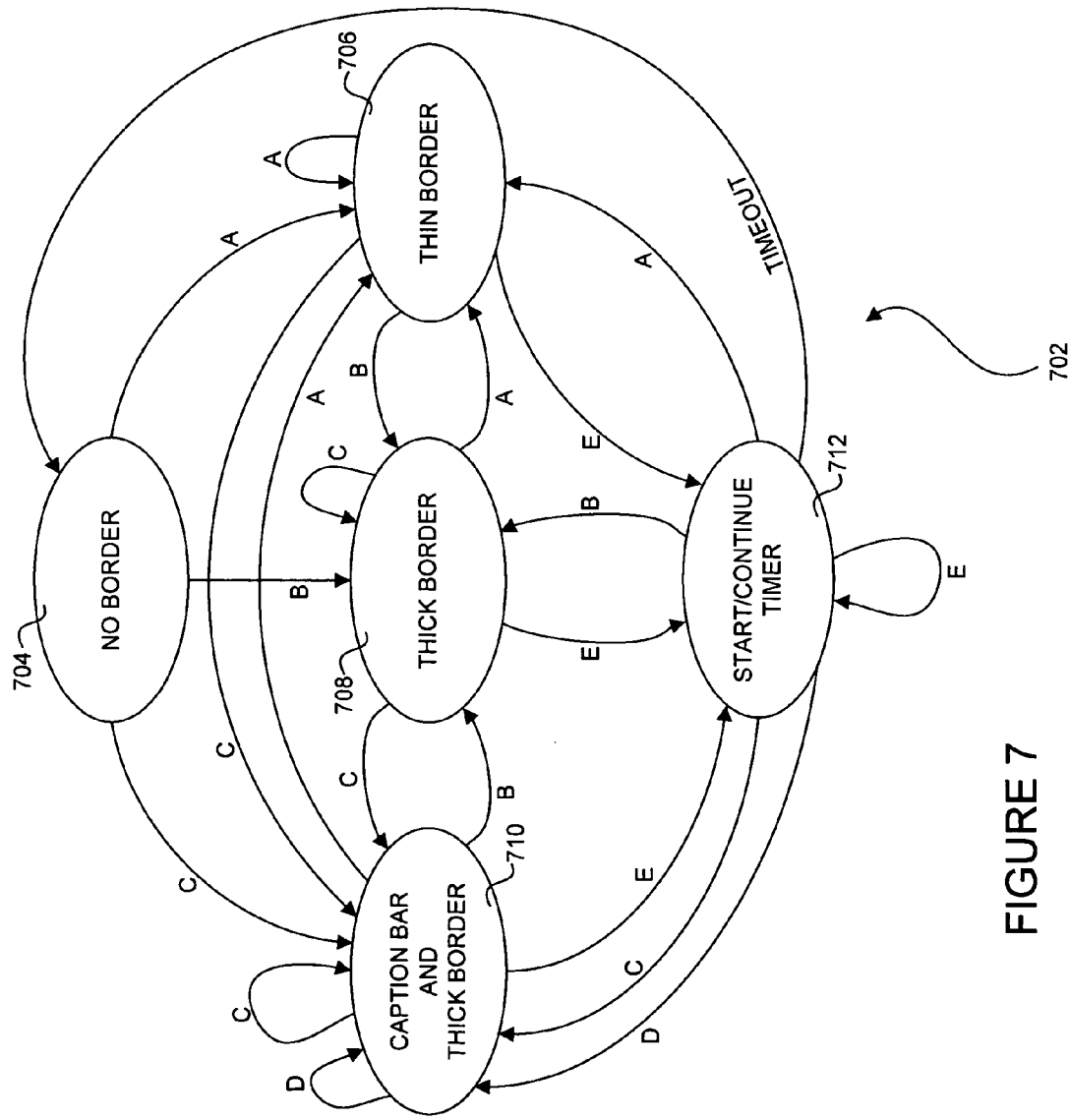
FIG. 7 is a state diagram illustrating an overall operating concept of an embodiment of the present invention.

FIG. 7 is a state diagram 702 that illustrates the changes in the caption bar and the borders, as affected by movement of the pointer. FIG. 7 is discussed with reference to the regions of FIG. 6. At a state 704, the desktop component 310 is displayed with no border and no caption bar. This is the state depicted in FIG. 2. Movement of the pointer into region A 606 causes a change to state 706, where a thin border is displayed. This is the state depicted in FIG. 3. Continued movement of the pointer within region A 606 causes no further change in state.

Returning to state 704, movement of the pointer within region B 608 causes a change to state 708, where a thick border is displayed. This is the state depicted in FIG. 4. Continued movement of the pointer within region C 608 causes no change of state from the state 708. Returning once again to the no border state 704, movement of the pointer within the region C 610 causes a change of state to the caption bar state 710. This is the state depicted in FIG. 5. Continued movement of the pointer within the caption bar state 610 causes no change of state.

From the thick border state 708, or the caption bar state 710, movement of the pointer into the thin border region 606 causes a change to the thin border state 706. Similarly, movement of the pointer into the thick border region 608 causes a change of state to the thick border state 708, and movement of the pointer into the caption bar region 610 causes a change of state to the caption bar state 710. Additionally, because the caption bar is displayed when in the caption bar state 710, movement of the pointer into the maintain caption bar state 612 causes a return to the caption bar state 710.

From the thin border state 706, the thick border state 708, or the caption bar state 710, movement of the pointer to the external region E 614 results in a change to the timer state 712. When the timer state 712 is first entered, a timer is started to count down a predetermined amount of time. While the timer is running, movement into the thin border region 606, the thick border region 608, or the caption bar region 610 causes the mechanism of the invention to turn off the timer and return to the thin border state 706, the thick border state 708, or the caption bar state 710, respectively. Additionally, if the caption bar is visible, movement into the maintained caption bar region 612, while the timer is on, causes a change of state to the caption bar state 710.

When in the timer state 712, pointer movements within the external region 614 result in continuation of the timer. If the timer times out, the state changes back to the no border state 704, where there is no visible border or caption bar.

Although FIGS. 6 and 7 illustrate one actual embodiment of the invention, these are to be considered exemplary, and the invention may include various modifications. For example, it is not required that a timer be used. Instead, any movement of the pointer into the external region 704 can cause a change to the no border state. Additionally, the regions depicted in FIG. 6 may be altered without departing from the spirit and scope of the invention. The invention may also include a state where a caption bar is visible but no border is visible.

Figure 8:
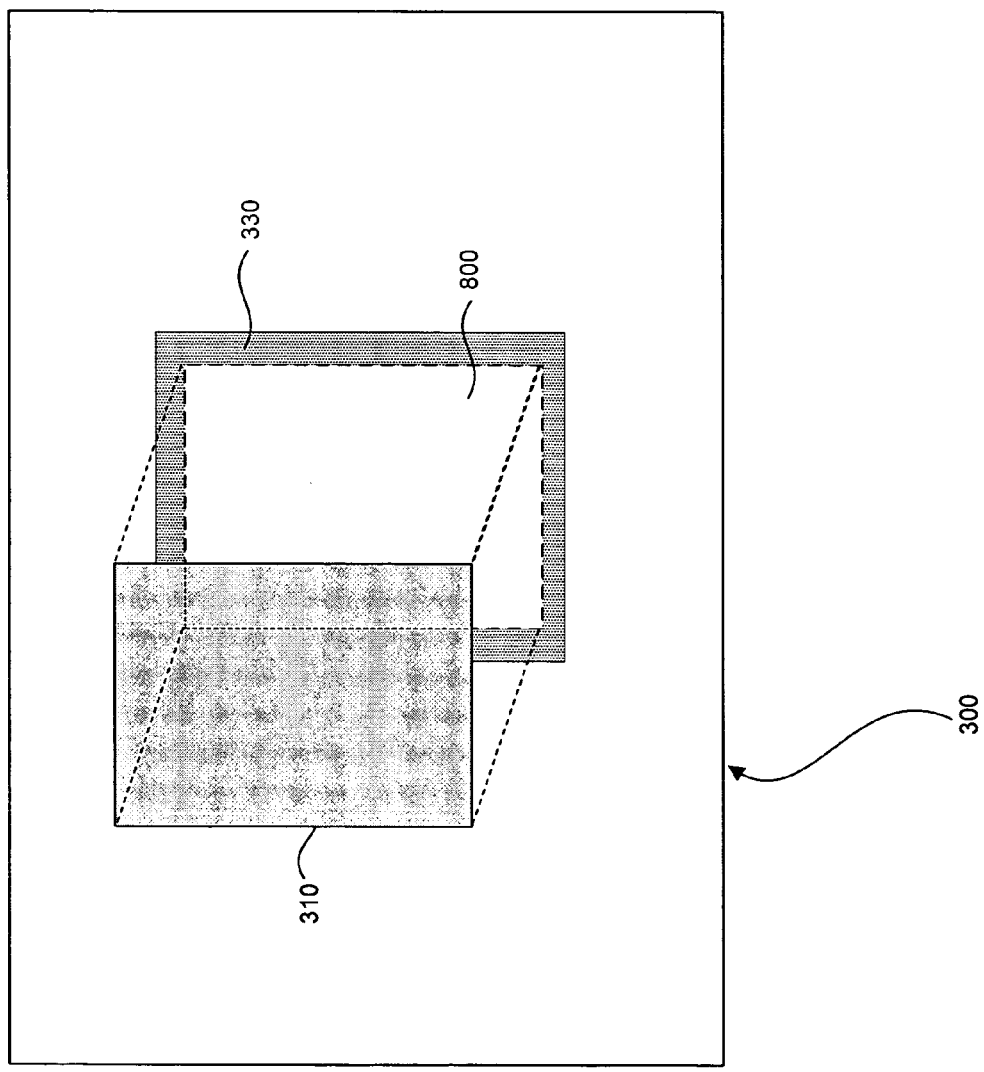
FIG. 8 illustrates a desktop component and a control for implementing the present invention.

FIG. 8 depicts a control for implementing the features of the present invention according to the state diagram shown in FIG. 6. While, to the user, the appearance on the display is of a desktop component 310 having borders and/or a caption bar, preferably, these elements are not elements of the desktop component. Rather, a border 330 and a caption bar 500 are elements of the control 800. In a present embodiment of the invention, the control 800 is implemented as an ActiveX control referred to as deskmovr. The deskmovr control may be used both with desktop components that are windowed objects as well as those that are windowless objects. A present embodiment of a desktop environment according to the present invention is known as the Active Desktop by Microsoft Corporation of Redmond, Wash. Under this desktop environment, a windowless object cannot be displayed in front of a windowed object. Since the deskmovr control is displayed directly a desktop component, both a windowed instance and a windowless instance is provided for in the deskmovr control. A parameter is passed to the deskmovr control indicating whether the desktop component is a windowed object or a windowless object so that the appropriate instance of the deskmovr control is used. The deskmovr control may also be used in an HTML environment, where the components, or subdocuments, are portions of HTML pages. In order for the present invention to operate in an HTML environment, the environment should support Dynamic HTML and in-line style sheets with positioning. In a present embodiment of the invention, the HTML environment is provided in the IE4/Trident object model in the Internet Client SDK by Microsoft Corporation of Redmond, Wash. This HTML environment is described more fully in Scott Issacs, *Inside Dynamic HTML*, Microsoft Press, Oct. 30, 1997, which is incorporated into the present specification by reference.

The deskmovr control includes a border 330 and a caption bar 500 (not shown in FIG. 8). When a relevant pointer event occurs, such as when the pointer completely enters the region defined by the desktop component (region A 606 in FIG. 6), the control moves directly underneath the desktop component, and resizes itself such that each edge of the control is one pixel farther out from a centerpoint than the corresponding edge of the desktop component (state 706 in FIG. 7). Since the desktop component is superimposed and displayed directly on top of the control, a one-pixel border appears around the desktop component. If the pointer event indicates that a caption bar should be displayed (region C 610 in FIG. 6; state 710 in FIG. 7), the deskmovr control additionally displays the caption bar. When a thick border is indicated (e.g., when the pointer enters region B 608 of FIG. 6), the deskmovr control changes the thickness of the border to three pixels (state 708 in FIG. 7). In a present embodiment of the deskmovr control, whenever the caption bar is indicated, a thick border is concurrently displayed; however, those skilled in the art will readily appreciate that another element or other combinations of elements may be displayed for any given pointer event without departing from the spirit of the invention.

While the preferred embodiment of the invention has been illustrated and described, it will be appreciated that various changes can be made therein without departing from the spirit and scope of the invention.

The invention claimed is:

1. In a computer system having a display and a pointing device, the pointing device controlling a position of a pointer on the display, a method for manipulating a subdocument visually embedded in a composite document output from the computer to the display, the subdocument initially appearing as an image, rather than as a window with windows functionality, and having a boundary defining a geometric area within the composite document, the method comprising:
   (a) tracking the position of the pointer on the display;
   (b) monitoring the position of the pointer relative to the subdocument;
   (c) automatically and without further user input displaying a first border around the subdocument when the pointer enters a first predefined region located within the boundary of the subdocument; and
   (d) automatically and without further user input displaying a second border around the subdocument when the pointer enters a second predefined region located near the boundary of the subdocument.

2. The method of claim 1, further comprising automatically and without further user input removing the second border displayed around the subdocument when the pointer moves out of the second predefined region.

3. The method of claim 1, further comprising automatically and without further user input removing the second border displayed around the subdocument when the pointer moves to an external region relative to the subdocument and a predetermined amount of time expires.

4. In a computer system having a display and a pointing device, the pointing device controlling a position of a pointer on the display, a method for manipulating a subdocument visually embedded in a composite document output from the computer to the display, the subdocument initially appearing as an image, rather than as a window with windows functionality, and having a boundary defining a geometric area within the composite document, the method comprising:
   (a) tracking the position of the pointer on the display;
   (b) monitoring the position of the pointer relative to the subdocument;
   (e) automatically and without further user input displaying a first border around the subdocument when the pointer enters a first predefined region located within the boundary of the subdocument; and
   (d) automatically and without further user input displaying a caption bar along an edge of the subdocument when the pointer enters a predefined caption bar region located adjacent to the boundary of the subdocument.

5. The method of claim 4, further comprising automatically and without further user input removing the caption bar displayed along an edge of the subdocument when the pointer moves out of the predefined caption bar region.

6. The method of claim 4, further comprising automatically and without further user input displaying a second border around the subdocument in conjunction with the caption bar when the pointer enters a predetermined area of the predefined caption bar region.

7. The method of claim 6, further comprising automatically and without further user input removing the caption bar displayed along an edge of the subdocument and the second border displayed around the subdocument when the pointer moves out of the predefined caption bar region.

8. The method of claim 6, further comprising automatically and without further user input removing the caption bar displayed along an edge of the subdocument and the second border displayed around the subdocument when the pointer moves to an external region relative to the subdocument and a predetermined amount of time expires.

9. The method of claim 4, further comprising automatically and without further user input removing the caption bar displayed along an edge of the subdocument when the pointer moves to an external region relative to the subdocument and a predetermined amount of time expires.

10. The method of claim 4, further comprising maintaining the caption bar along an edge of the subdocument when the pointer enters a predefined maintained caption bar region relative to the subdocument.

11. In a computer system having a display and a pointing device, the pointing device controlling a position of a pointer on the display, a method for manipulating a subdocument visually embedded in a composite document output from the computer to the display, the subdocument initially appearing as an image, rather than as a window with windows functionality, and having a boundary defining a geometric area within the composite document, the method comprising:

(a) tracking the position of the pointer on the display;

(b) monitoring the position of the pointer relative to the subdocument;

(c) automatically and without further user input displaying a first border around the subdocument when the pointer enters a first predefined region located within the boundary of the subdocument; and (d) automatically and without further user input removing the first border displayed around the subdocument when the pointer moves to an external region outside of the boundary of the subdocument and a predetermined amount of time expires.

12. In a computer system having a display and a pointing device, the pointing device controlling a position of a pointer on the display, a method for manipulating a subdocument visually embedded in a composite document output from the computer to the display, the subdocument initially appearing an as image, rather than as a window with windows functionality, and having a boundary defining a geometric area within the composite document, the method comprising:

(a) providing a control including a visual clement for:
   (1) tracking the position of the pointer;
   (2) monitoring the position of the pointer relative to the subdocument; and
   (3) displaying the visual clement;

(b) activating the control; and (c) automatically and without further user input displaying the visual element when the control detects that the pointer has entered a first predefined region located within the boundary of the subdocument;

wherein the visual element is a border, the control has a boundary defined by edge segments having a thickness, and displaying the visual element further comprises:
   (c1) moving and centering the control under the subdocument;
   (c2) resizing the control such that the control has a boundary having substantially same, but slightly larger, dimensions as the subdocument boundary;
   (c3) increasing the thickness of the edge segments of the control boundary; and
   (c4) automatically and without further user input displaying the control boundary as a thick border around the subdocument.

13. In a computer system having a display and a pointing device, the pointing device controlling a position of a pointer on the display, a method for manipulating a subdocument visually embedded in a composite document output from the computer to the display, the subdocument initially appearing an as image, rather than as a window with windows functionality, and having a boundary defining a geometric area within the composite document, the method comprising:

(a) providing a control including a visual element for:
   (1) tracking the position of the pointer;
   (2) monitoring the position of the pointer relative to the subdocument; and
   (3) displaying the visual element;

(b) activating the control; and (c) automatically and without further user input displaying the visual element when the control detects that the pointer has entered a first predefined region located within the boundary of the subdocument;

wherein the visual element is a caption bar, and displaying the visual element further comprises:
   (c1) automatically and without further user input displaying the caption bar along an edge of the subdocument boundary.

14. The method of claim 13, further comprising maintaining the caption bar along an edge of the subdocument when the control detects that the pointer enters a predefined maintained caption bar region relative to the subdocument.

15. In a computer system having a display and a pointing device, the pointing device controlling a position of a pointer on the display, a method for manipulating a subdocument visually embedded in a composite document output from the computer to the display, the subdocument initially appearing an as image, rather than as a window with windows functionality, and having a boundary defining a geometric area within the composite document, the method comprising:

(a) providing a control including a visual element for:
   (1) tracking the position of the pointer;
   (2) monitoring the position of the pointer relative to the subdocument; and
   (3) displaying the visual element;

(b) activating the control;

(c) automatically and without further user input displaying the visual element when the control detects that the pointer has entered a first predefined region located within the boundary of the subdocument; and (d) automatically and without further user input removing the visual element from the display when the control detects that the pointer has moved to an external region outside of the boundary of the subdocument and a predetermined amount of time has expired.

* * * * *